R. B. HUGUNIN.
Car Wheel.
No. 87,496.   Patented March 2, 1869.
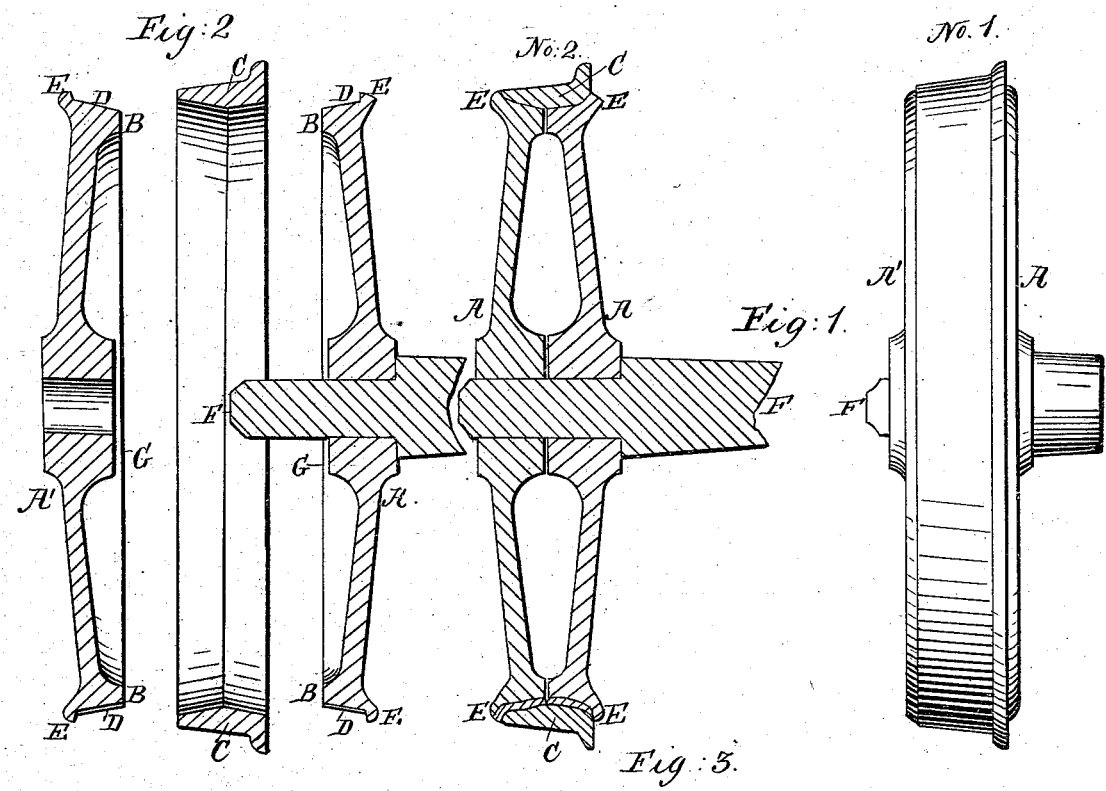
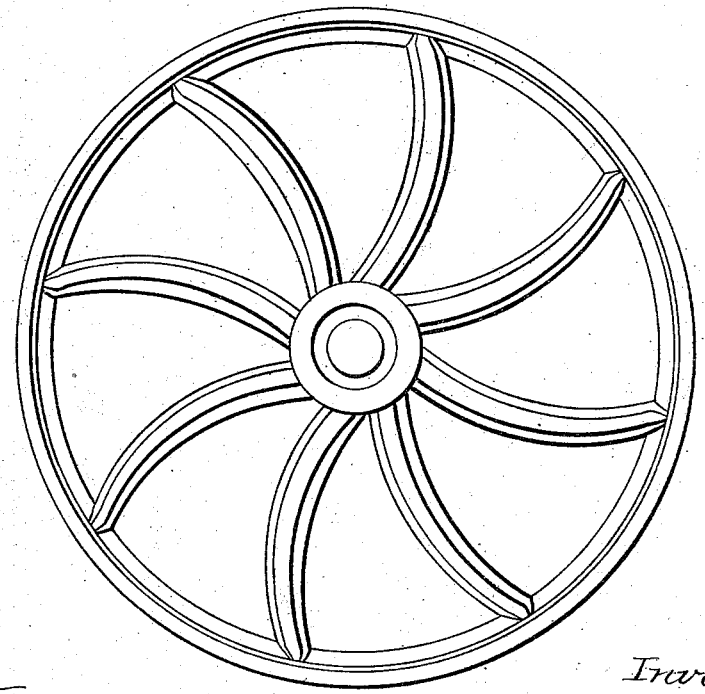
Witnesses
Inventor

UNITED STATES PATENT OFFICE.

ROBERT B. HUGUNIN, OF CLEVELAND, OHIO.

IMPROVED CAR-WHEEL.

Specification forming part of Letters Patent No. 87,496, dated March 2, 1869.

*To whom it may concern:*

Be it known that I, ROBERT B. HUGUNIN, of Cleveland, county of Cuyahoga, State of Ohio, have invented a new and useful Car-Wheel; and I do hereby declare that the following is a full, clear, and exact description of the same, reference being had to the accompanying drawings, making a part of this specification.

This invention consists in constructing a car-wheel consisting of two sections, tire and axle, the two sections being beveled or curved on their outer edges, with the tire similarly shaped on its inner side, by forcing one of these sections over the axle, laying the tire in position upon it, and then, in the same way, forcing the other section down upon it, the beveled or curved edges crowding out upon and clamping the tire in such manner as to secure it, the friction upon the axle holding the sections in place.

Figure 1, No. 1, shows one of these wheels as in use, made up complete. Fig. 1, No. 2, is a cross-section of the same, with the disks, tire, and axle, as in use. Fig. 2 is a cross-sectional plan of the disks and tire, each separated from the other. Fig. 3 is a side view of the wheel.

Similar letters of reference indicate corresponding parts in all the drawings.

To enable those skilled in the art to fully understand my invention, I will proceed to describe its construction and operation.

In the drawings, A and A' are the two disks or sections of my wheel, which may or may not be exact duplicates of each other. The lengths of the hubs on these sections may vary, if thought advantageous. The inside hub is pressed against the shoulder of the axle, and to give the other hub a corresponding amount of support, I lengthen it, giving it more friction-surface on the axle. The general contour of the shell, formed by A and A', will be made such as to afford the greatest stiffness and support to the tire, and insure them against warping or improper shrinking in casting, the details of which I will not describe here, as they are clearly within the knowledge and experience of all skillful pattern-makers and practical foundrymen. I will, however, say that they (the sections A and A') may be cast concave or plain, with or without curved arms or swells, either on their inner or outer sides.

B and B', tire-seats, so called, cast on the outer rims of the disks A and A', for the purpose of clasping, pressing outward, and securely holding the tire. They may be made beveling or curved, with a corresponding shape on the under side of the tire.

In putting this wheel together, the spaces between the disks and tire close almost immediately with a strong outward pressure, when the tire is beveled or curved; but without these beveled or curved surfaces the sliding friction is continual from the start, and no secure fastening can be made or disks closely fitted without shrinking on the tire by first heating, which, in a car-wheel, for reasons I will not here explain, is impracticable.

C, a steel or other suitable tire, made in shape, on its under side, to correspond to the seats B and B' of the sections A and A', on which it is to be used. It is made or rolled complete, of the pattern desired, its face being similar to the face, with flange, &c., of present car-wheel.

It is evident very many changes may be made in the under side of this tire from the true bevels illustrated in the drawings, and all clearly trespass upon the invention herein shown—viz., the power to close with the seats B and B' without the sliding friction heretofore alluded to, and with an outward pressure upon the tire. The general plan of this wheel being shown a practical mechanic, these slight modifications in the shapes of tire and seats would be clearly within his knowledge.

D and D', thin sections or strips of packing, rubber, and cloth, or rubber and felt, &c., cut out of the sheet and temporarily gummed down to the seats B and B' before putting the wheel together. There being little or no sliding friction on these surfaces, the packing remains and is compressed where placed. Packing of this description may also be advantageously placed between the inner and outer hubs before pressing them together; also between the projections E and E' and tire, if wanted there.

This packing is used for the purpose of destroying, as far as possible, the metal connection between the tire and sections A and A', and also to prevent the hammering of the ends of the rails, so as to destroy or batter them up in rolling over them, and also to prevent the constant jar which crystallizes the axles, &c. The projections E and E' are a part of the sections A and A', and are useful, in combination with the beveled or curved seats B and B', in holding the tire firmly in its place, and close the joint between the tire and sections. F, wrought-iron axle, making a part of this wheel.

It should be borne in mind that the arrangement of my sections A and A' and tire C is not a wheel, nor can they be called a wheel till made up on the axle in the manner hereinafter described.

The process of making my wheel is substantially as follows: The axle F is turned down to the proper size, with a slight taper at the end. The sections A and A' have holes bored through them transversely, a trifle smaller than the turned axle. Then the section intended for the inner side is properly placed over the axle, and forced, by hydraulic pressure, down to the position it is to occupy against the shoulder. The tire, flange side down, is then laid in its place upon this section, and the other section forced down upon it by the same pressure, so as to close to it tightly. This occurring, there still should be left a space between the inner and outer hubs of the two sections, as shown at G and G', Fig. 2, for the final pressure which is to force these hubs together and spring the two sections from their centers outward onto the tire, thus creating that tightness of fit on the tire heretofore only accomplished by the process known as "shrinking on," and insuring it beyond contingency from moving in its place.

The use of bolts, keys, &c., for additionally securing the sections together, in combination with the friction on the axle, is not considered essential.

The friction on the axle, caused by forcing the disks over them at an enormous pressure, and the spring of the disks reacted on the tire are considered amply sufficient to accomplish all that is desirable or practicable in that direction in the way of strength, simplicity, and durability.

From the construction of this wheel it is evident that should any accident happen to any part of it, that part only would have to be replaced; and, further, the use of the steel tire is here rendered practicable by a very simple process.

The common wheel now used, shell, tire, and all, is made of a single casting, and of cast-iron, and is liable, from the nature of its material, to fracture, crack, and go to pieces at any time from extreme heat or cold, or a sudden rap.

The Angola disaster is believed to have resulted from a broken flange. This could hardly occur with steel tires, as steel does not easily break, and the construction of this wheel is such, no bolts or keys being used, or tire shrunk on, as to allow it to contract or expand without risk or danger.

Having thus described my invention, what I claim, and desire to secure by Letters Patent, is—

1. The car-wheel herein described, constructed by forcing the sections A and A' over the axle F, and clamping the tire C by means of the spring on said section reacted on the tire, substantially as and for the purposes herein set forth.

2. The car-wheel formed by forcing sections A and A', with seats B and B' and projections E and E', onto the tire C, constructed in corresponding form on its under side, over the axle F, as and for the purposes herein set forth.

3. In combination with the above-claimed car-wheel, the interposed rubber packing, as and for the purposes herein set forth.

R. B. HUGUNIN.

Witnesses:
   JNO. D. PATTEN,
   DEWITT COWL.